No. 861,616. PATENTED JULY 30, 1907.
A. L. SPENCE.
EYEGLASSES.
APPLICATION FILED SEPT. 6, 1905.

Witnesses:
Geo. E. Garrett
Chas. H. Potter

Inventor:
Alexis L. Spence,
by Byrnes & Townsend,
Att'ys.

UNITED STATES PATENT OFFICE.

ALEXIS L. SPENCE, OF SAN FRANCISCO, CALIFORNIA.

EYEGLASSES.

No. 861,616.  Specification of Letters Patent.  Patented July 30, 1907.

Application filed September 6, 1905. Serial No. 277,247.

*To all whom it may concern:*

Be it known that I, ALEXIS L. SPENCE, a citizen of the United States, residing at San Francisco, in the county of San Francisco and State of California, have invented certain new and useful Improvements in Eyeglasses, of which the following is a specification.

This invention relates to improvements in eye glasses.

The object of the invention is to provide a construction of eye glasses which will be neat in appearance and in which the frame portion will be scarcely noticeable; which will be comfortable to the wearer; in which the pressure by the nose guards upon the sides of the nose will be at a very high point; which can be readily adjusted to the desired position; in which the lenses will not be liable to break; and in which the plane of the lenses can be easily changed from the reading position to a distant sight position.

A further object of the invention is to provide a construction which will be simple and cheap.

Figure 1:
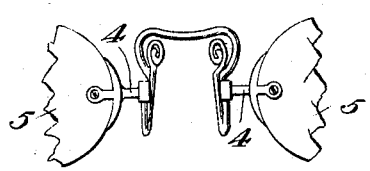
Figure 2:
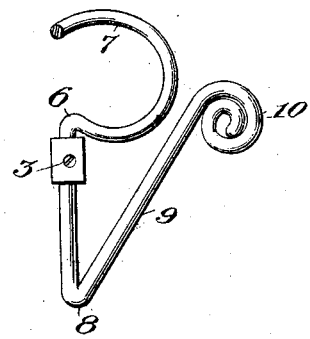
Figure 4:
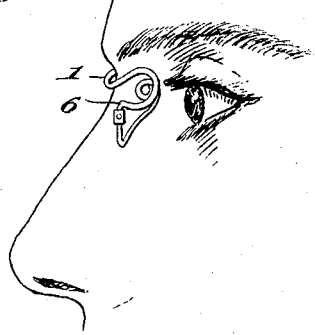
Figure 3:
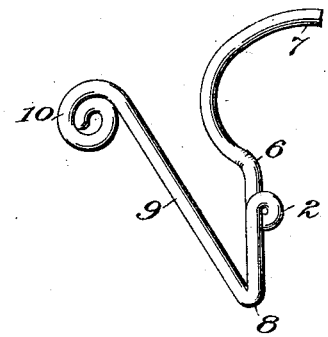
Figure 6:
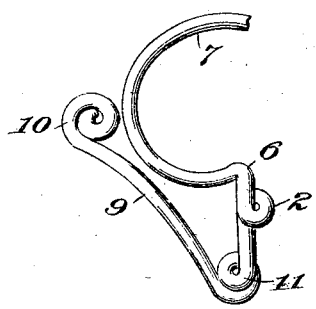
Figure 5:
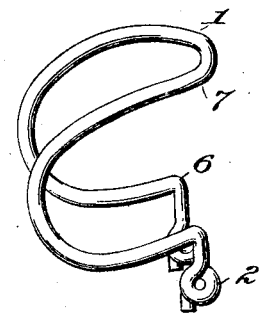

In the accompanying drawing, Figure 1 is a front elevation of the eye glasses, the lenses being broken; Fig. 2 is a central sectional view showing one-half of the combined bow and guard detached from the lens post; Fig. 3 is a central sectional view showing the loop through which the supporting screw for the lens post passes. Fig. 4 is a perspective view showing the device in position, the lenses being omitted; Fig. 5 is a perspective view of a modified form of the device, in which the guards are omitted; Fig. 6 is a view similar to Fig. 3 of a further modification.

Referring to the drawing, 1 represents a bow of spring wire, which is coiled to form small eyes or loops 2 through which can be passed screws 3 to attach it to the posts 4 which support the lenses 5. From said eyes the spring extends vertically upwards to points 6 from which it makes a sharp bend backwards or behind the plane of the lenses, then upwards, then forwards again, across the top of the nose, to form a bow 7, being identical on both sides of the nose. In the form shown in Figs. 1 to 4, the spring wire is continued downwards to points 8, whence it makes a sharp bend upwards and rearwards as shown at 9, the ends thereof being curled in spiral coils 10 said coils forming nose guards and being adapted to rest against the nose immediately beneath the frontal bone.

In the modification shown in Fig. 5, the downward extensions of the spring are omitted, and the bow is attached by means of the eyes or loops 2 to any suitable mountings in common use. The advantages of this construction are:—First, the device is very neat in appearance, being hardly perceptible, the part which rests upon the face being high up immediately under the frontal bone, so that it can hardly be seen, so that practically the only part visible is a thin wire which extends across the nose at the top thereof. It readily adjusts itself to different desired positions. It is extremely comfortable in use as the wire is of very light weight and the only part exerting pressure is the coiled spring which by its position of contact avoids pressure upon any nerves. It is very easy to adjust the plane of the lenses to the desired angle for reading or for distant sight. The long thin spring which is flexible in many directions renders the device more durable because the lenses are not so liable to break, since the spring would readily give way to any force which would tend to break the lens.

In the modification shown in Fig. 6 the wire is formed into a coil 11 at its lowest point. This gives a stronger spring pressure for the point 9, and also furnishes for the eye glasses two points of support on each side of the nose.

I claim:—

1. In a device of the character described, the combination with the lenses and the posts therefor, of a bridge for the eye glasses comprising a single piece of wire having the ends formed into loops and attached to said posts and extending first upwardly, then rearwardly and upwardly, and then forwardly, across the nose, substantially as described.

2. A nose guard consisting of a single piece of spring wire extending across the nose, and being then bent first rearwardly, then downwardly, then forwardly, then vertically downwards, then bent to form loops or eyes for attachment to the lens posts, then downwards, and then rearwardly and upwardly, the ends thereof being coiled to form surfaces of support for the glasses, in combination with the lenses and posts, substantially as described.

In witness whereof I have hereunto set my hand in the presence of two subscribing witnesses.

A. L. SPENCE.

Witnesses:
FRANCIS M. WRIGHT,
BESSIE GORFINKEL.